(12) United States Patent
Shimada

(10) Patent No.: US 7,866,988 B2
(45) Date of Patent: Jan. 11, 2011

(54) LOCKING CONNECTOR

(75) Inventor: Masaaki Shimada, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/635,977

(22) Filed: Dec. 11, 2009

(65) Prior Publication Data

US 2010/0167592 A1 Jul. 1, 2010

(30) Foreign Application Priority Data

Dec. 25, 2008 (JP) .............................. 2008-329852

(51) Int. Cl.
*H01R 1/00* (2006.01)
(52) U.S. Cl. .................................... 439/76.1
(58) Field of Classification Search ............... 439/76.1, 439/326, 341, 342
See application file for complete search history.

(56) References Cited

U.S. PATENT DOCUMENTS

| | | | |
|---|---|---|---|
| 6,099,337 A * | 8/2000 | Chan ........................ | 439/326 |
| 6,805,570 B1 * | 10/2004 | Lee ........................... | 439/326 |
| 7,232,326 B2 * | 6/2007 | Uchida et al. ............... | 439/326 |
| 2003/0190832 A1 * | 10/2003 | Matsunaga et al. .......... | 439/331 |
| 2008/0124964 A1 * | 5/2008 | Chen ......................... | 439/326 |

FOREIGN PATENT DOCUMENTS

JP 2005-302334 A 10/2005

* cited by examiner

*Primary Examiner*—T C Patel
*Assistant Examiner*—Phuong Nguyen
(74) *Attorney, Agent, or Firm*—Holtz, Holtz, Goodman & Chick, PC

(57) ABSTRACT

A connector in which contact between a circuit board and a card-type electronic device is made less liable to be unstable, even when the connector is subject to a shock. One (37) of a pair of arms (37, 38) of a base (3) is made elastically deformable. A holddown (43) is provided on the arm (37) such that the arm (37) cannot be elastically deformed when the base (3) is mounted on the circuit board.

8 Claims, 16 Drawing Sheets

LOCKING CONNECTOR

BACKGROUND OF THE INVENTION

1. Field of the Invention

This invention relates to a connector, and more particularly to a connector which is mounted on a printed circuit board, and electrically connects between a card-type electronic device and the printed circuit board.

2. Description of the Related Art

Conventionally, there has been proposed a connector comprised of a base insulator (base), a plurality of contacts, and a cover member (cover) (see Japanese Laid-Open Patent Publication (Kokai) No. 2005-302334).

The base insulator is substantially tray-shaped. The base insulator includes a pair of side walls. Each of the pair of side walls is formed with a long hole-shaped bearing. A card (card-type electronic device) is placed on the base insulator.

The plurality of contacts are arranged at equally-spaced intervals on the base insulator. Each contact includes a contact portion and a terminal portion. The contact portion is brought into contact with an associated terminal of the card. The terminal portion is soldered to a pad of a printed circuit board.

The cover member includes a pair of rail portions and a pair of arms. The cover member holds the card by the pair of rail portions. The card held by the cover member is capable of being inserted/removed in and from the cover member in a longitudinal direction of the rail portions. Each arm is plate-shaped, and is elastically deformable. A pivot portion is disposed on each arm. The pivot portion is supported by the bearing in a manner pivotally-movable and movable in a front-rear direction of the base insulator. The cover member is connected to the base insulator in a manner pivotally-movable between an open position and a closed position, and at the same time in a manner movable between an unlocked position and a lockable position along the front-rear direction of the base insulator.

When the cover member is in the open position, the cover member is removed from the opening of the base insulator, whereby the opening of the base insulator is opened. At this time, it becomes possible to insertion/remove the card in the base insulator. When the cover member is in the closed position, and at the same time in the unlocked position, the card held by the cover member is lightly urged against the contacts. When the cover member is in the closed position, and at the same time in the lockable position, that is, when the cover member is locked to the base insulator, the contact portions of the contacts are brought into contact with the terminal portions of the card, whereby the card and the printed circuit board are electrically connected to each other.

When the cover member is assembled to the base insulator, since the spacing between the pair of pivot portions of the arms is narrower than that of the pair of bearings of the base insulator, the spacing of the pair of pivot portions is made larger than that of the pair of bearings through elastic deformation of the arms of the cover member, and then, the pivot portions are inserted into the bearings.

As described above, in the conventional connector, the arms of the cover member are made elastically deformable in order to insert the pivot portions of the cover member into the bearings of the base insulator.

Therefore, for example, if the electronic device equipped with this connector is dropped, the arms of the cover member are elastically deformed due to shock, whereby the cover member is lifted from the base insulator, which makes unstable the contact between the card and the printed circuit board.

SUMMARY OF THE INVENTION

The present invention has been made in view of these circumstances, and an object thereof is to provide a connector in which contact between a circuit board and a card-type electronic device is made less liable to be unstable even when the connector is subject to a shock.

To attain the above object, the present invention provides connector comprising a base including a pair of arms, the base being mounted on a circuit board, and for having a card-type electronic device placed thereon, a plurality of contacts held by the base in an insulated state, a cover that urges the card-type electronic device against the contacts, a pair of pivot portions that are provided on one of the pair of arms or the cover, and bearings that are formed in the other of the pair of arms and the cover, for supporting the pair of pivot portions in a manner pivotally-movable to thereby connect the cover to the base in a manner pivotally-movable, wherein at least one of the pair of arms is elastically deformable in an axial direction of the pivot portions, and wherein at least the elastically deformable arm is provided with a fixing portion that is fixed to the circuit board.

With this arrangement of the connector according to the present invention, the fixing portion which is fixed to the circuit board is provided on the elastically deformable arm. Therefore, if the connector is mounted on the circuit board, and the fixing portion is fixed to the circuit board, it becomes impossible to elastically deform the arm.

Preferably, each of the bearings is a long hole that holds an associated one of the pivot portions in a manner movable in a longitudinal direction of the arms.

More preferably, the cover includes a lock mechanism that locks the cover to the base, when the cover is moved by a predetermined distance in the longitudinal direction of the arms in a state in which the cover covers the base.

Further preferably, the cover includes a click mechanism for causing an operator of the cover to sense a click when the cover is locked to the base, and when the cover is unlocked from the base.

Preferably, at least the elastically deformable arm and the fixing portion are formed of a metal plate.

According to the present invention, even if the connector is subject to a shock, the contact between the circuit board and the card-type electronic device is less liable to be unstable.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
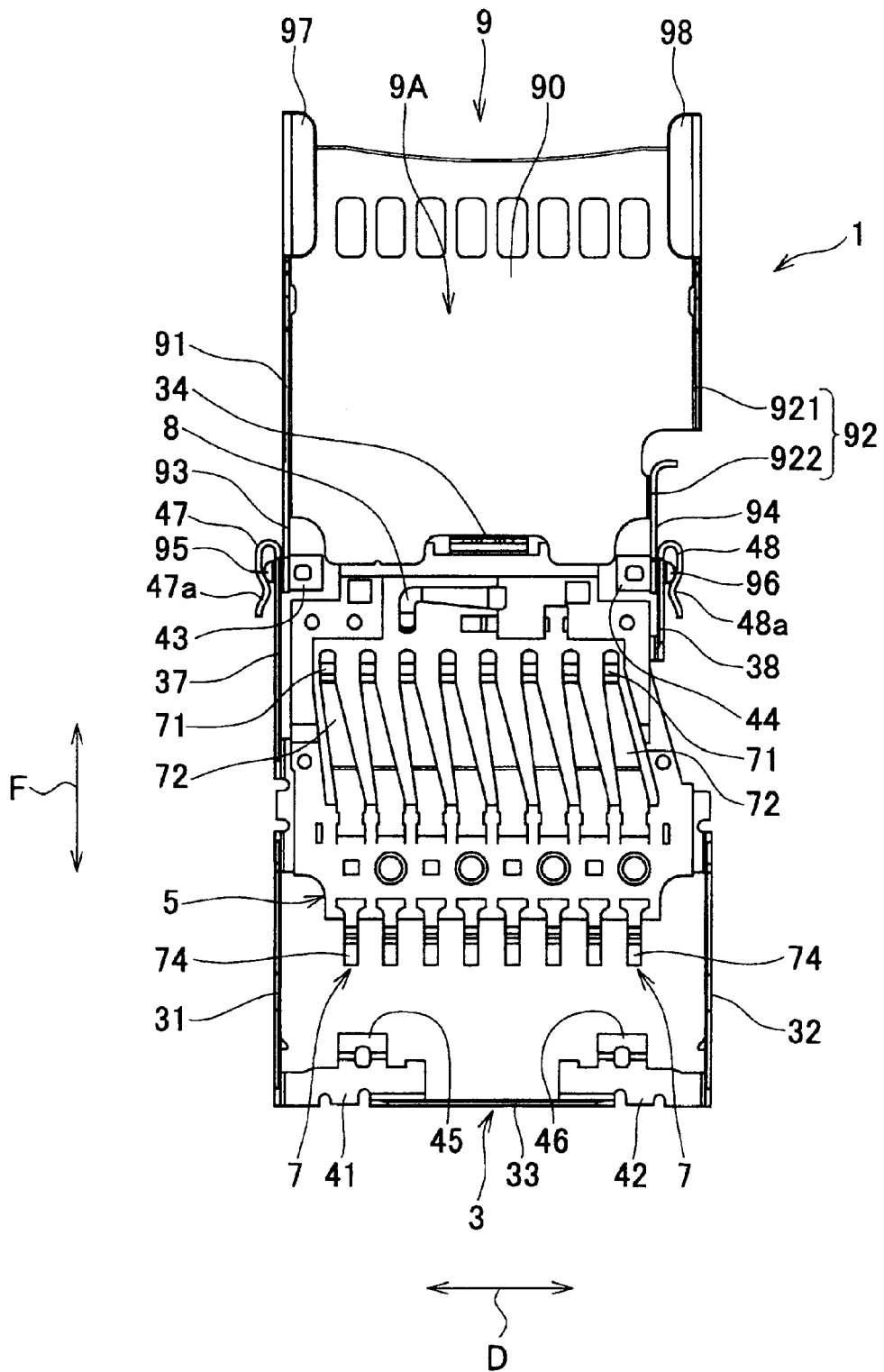
FIG. 1 is a plan view of a connector according to an embodiment of the present invention.

Referring to FIG. 1, a connector 1 is comprised of a base 3, a resin portion 5, a plurality of contacts 7, a switch contact 8, and a cover 9. The connector 1 is mounted on a printed circuit board, not shown (circuit board). The connector 1 electrically connects a memory card (card-type electronic device) 21 (see FIG. 7), such as an SD card, a PC card or the like, and the printed circuit board to each other.

Figure 2:
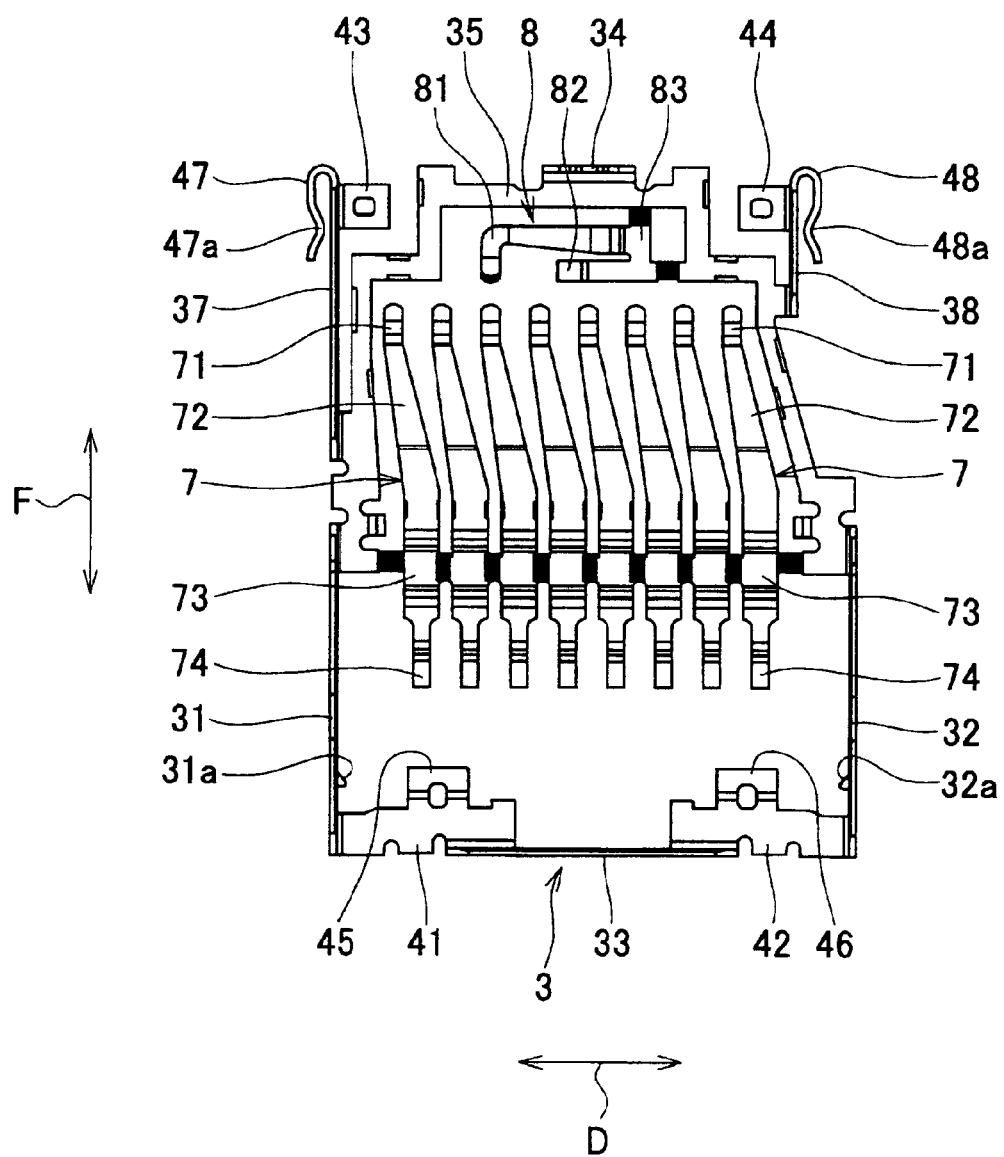
FIG. 2 is a plan view of a base and contacts in a state before a resin portion of the FIG. 1 connector is formed.

Referring to FIG. 2, the base 3, the plurality of contacts 7, and the switch contact 8 are formed by blanking and bending one metal plate having elasticity and electrical conductivity.

Figure 3:
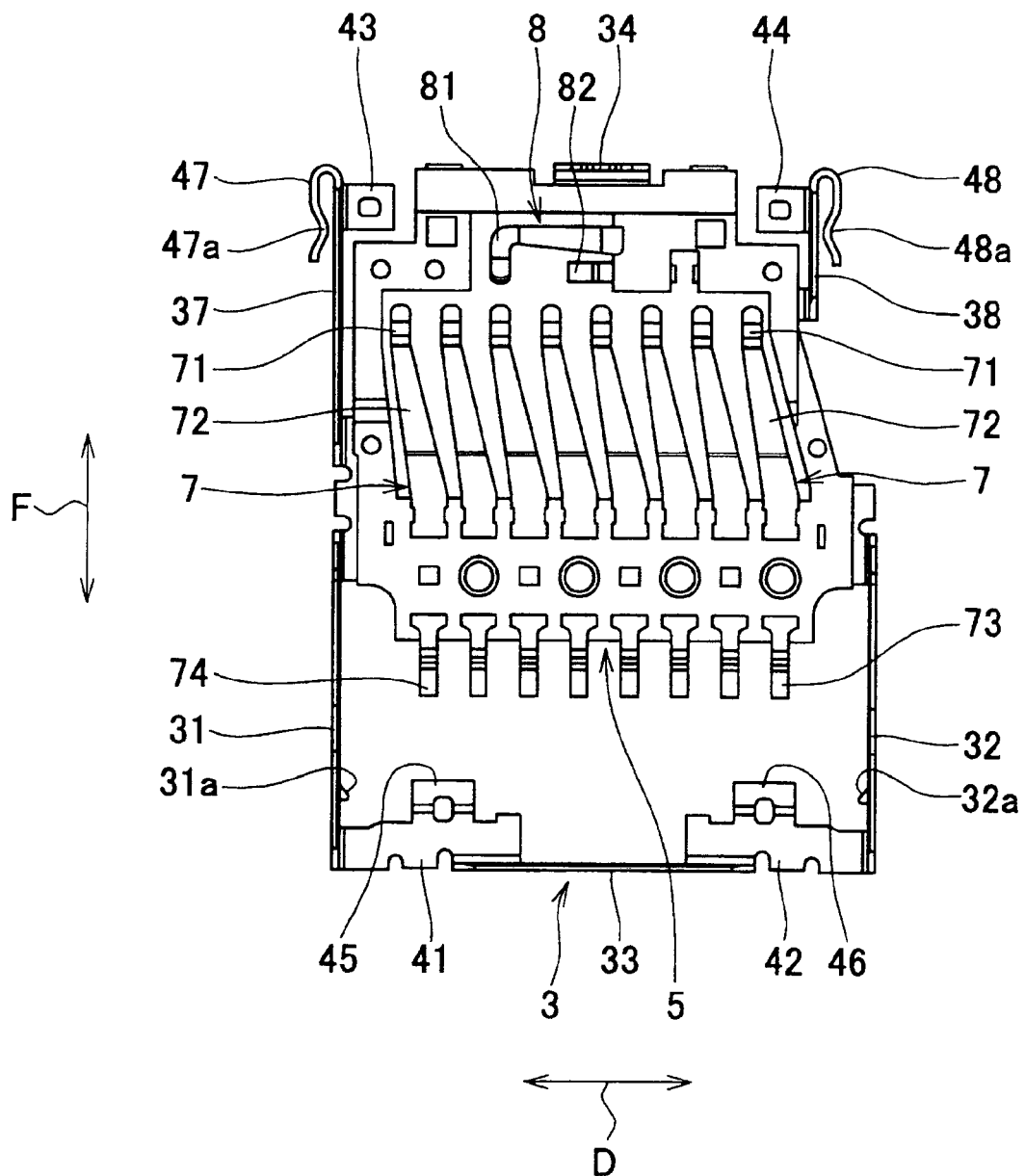
FIG. 3 is a plan view of the base and the resin portion of the FIG. 1 connector.

As shown in FIGS. 2 and 3, the base 3 includes side walls 31 and 32, a front wall 33, a rear wall 34, a connecting portion 35, arms 37 and 38, bottom boards 41 and 42, holddowns (fixing portions) 43, 44, 45, and 46, and click boards 47 and 48.

Figure 11:
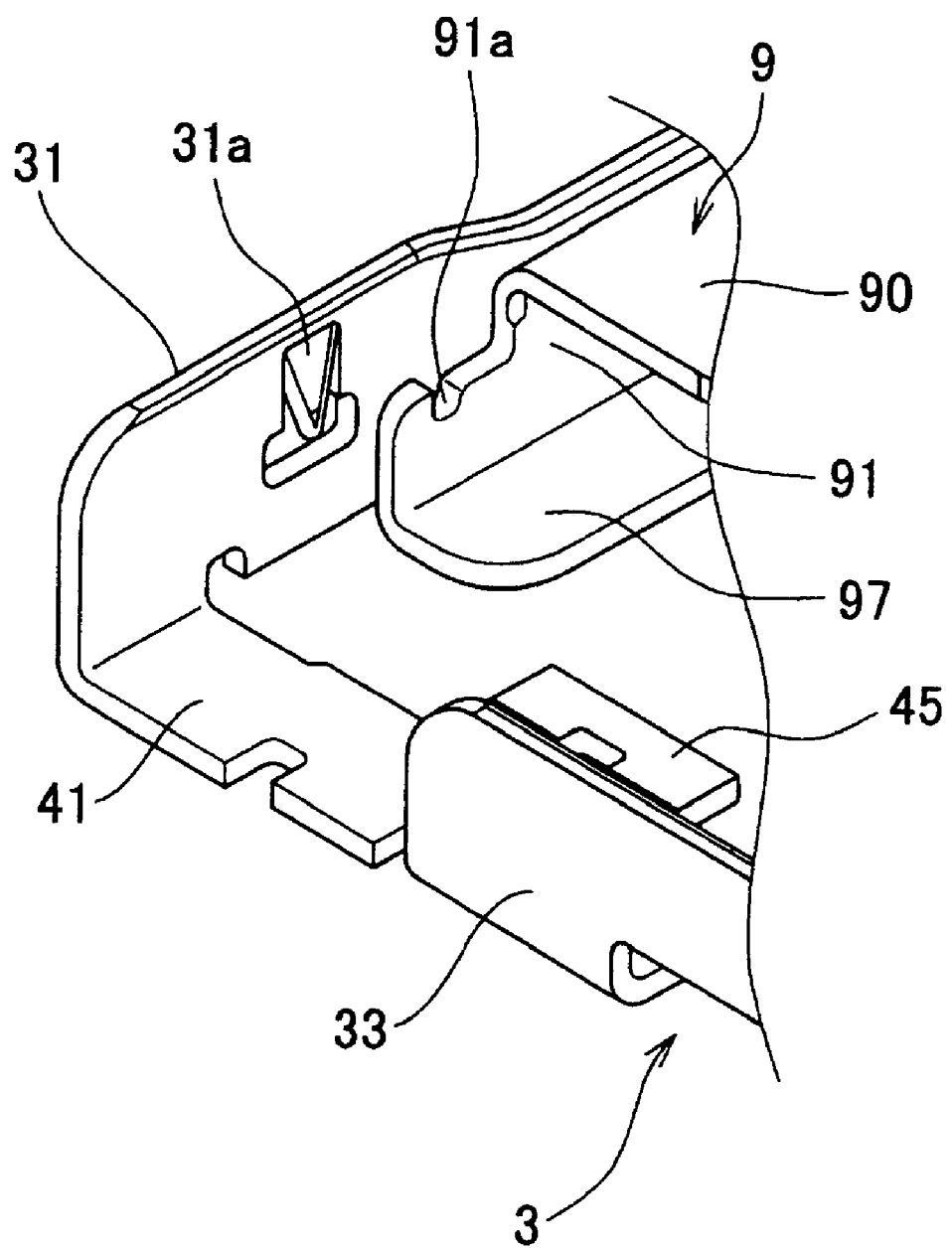
FIG. 11 is an enlarged perspective view of a lock mechanism of the connector in the state shown in FIG. 10.

The side walls 31 and 32 are plate-shaped, and include locking lugs 31a and 32a, respectively (see FIG. 11). The locking lugs 31a and 32a are substantially triangle-shaped, and are formed by cutting out and raising the respective side walls 31 and 32. The locking lugs 31a and 32a are located at front portions of the side walls 31 and 32, and protrude inward from the side walls 31 and 32, respectively.

The front wall 33 is plate-shaped. The front wall 33 supports the memory card 21 held by the cover 9 to prevent the memory card 21 from falling off the cover 9.

The rear wall 34 is plate-shaped. The rear wall 34 supports the memory card 21 held by the cover 9 to prevent the memory card 21 from falling off the cover 9.

The connecting portion 35 is substantially U-shaped, connects the arms 37 and 38 to each other, and at the same time, connects between the arms 37 and 38 and the side walls 31 and 32, respectively. Further, the connecting portion 35 connects between the rear wall 34, and the arms 37 and 38.

The arm 37 is plate-shaped, and is at a location rearward of the side wall 31 on an imaginary straight line, not shown, on which the side wall 31 is located. The front end portion of the arm 37 is continuous to the connecting portion 35. The arm 37 is elastically deformable in a direction of the thickness thereof. The arm 37 is longer than the arm 38.

The arm 38 is plate-shaped, and is at a location rearward of the side wall 32. The arm 38 is closer in the contact arranging direction D of the contacts 7 to the contacts 7 than the side wall 32 is. The front end portion of the arm 38 is continuous to the connecting portion 35. The arm 38 is elastically deformable in a direction of the thickness thereof. However, since the arm 38 is shorter than the arm 37, the arm 38 is not elastically deformed as much as the arm 37. A location of the rear end of the arm 38 in the front-rear direction F of the base 3 is the same as that of the rear end of the arm 37.

The bottom board 41 is continuous to the front end portion of the side wall 31, and the bottom board 42 is continuous to the front end portion of the side wall 32. The bottom board 41 is continuous to the front wall 33 and the side wall 31, and the bottom board 42 is continuous to the front wall 33 and the side wall 32.

The holddowns 43 and 44 each have a rectangular shape, and are continuous to the arms 37 and 38, respectively. The holddowns 43 and 44 are soldered to pads on the printed circuit board.

The holddowns 45 and 46 each have a rectangular shape, and are continuous to the bottom boards 41 and 42, respectively. The holddowns 45 and 46 are soldered to pads on the printed circuit board.

The click boards 47 and 48 are continuous to the respective rear ends of the arms 37 and 38, and are located outside of the respective arms 37 and 38 in a manner folded back. The click board 47 includes a protruding portion 47a, and the click board 48 includes a protruding portion 48a (see FIG. 1). The protruding portions 47a and 48a protrude toward the arms 37 and 38, respectively.

The resin portion 5 is formed by a so-called mold-in molding method after cutting black parts shown in FIG. 2. The resin portion 5 covers fixing portions 73 of the plurality of contacts 7, a fixing portion 83 of the switch contact 8, and the connecting portion 35. As a result, the plurality of contacts 7 are held at equally-spaced intervals in an insulated state, and are connected to the connecting portion 35, and the switch contact 8 is connected to the connecting portion 35 in an insulated state.

The plurality of contacts 7 each include a contact portion 71, a spring portion 72, the fixing portion 73, and a terminal portion 74. The contact portion 71 is brought into contact with an associated one of terminal portions 21a (see FIG. 7) of the memory card 21. The spring portion 72 is continuous to the contact portion 71, and urges the contact portion 71 against the associated one of the terminal portions 21a of the memory card 21. The fixing portion 73 is continuous to the spring portion 72, and is held by the resin portion 5. The terminal portion 74 is soldered to a pad on the printed circuit board.

The switch contact 8 includes a first contact piece 81, a second contact piece 82, and the fixing portion 83. The first contact piece 81 is substantially L-shaped, and is continuous to the fixing portion 83. The second contact piece 82 extends in the contact arranging direction D, and is continuous to the fixing portion 83. The fixing portion 83 is held by the resin portion 5.

Figure 4:
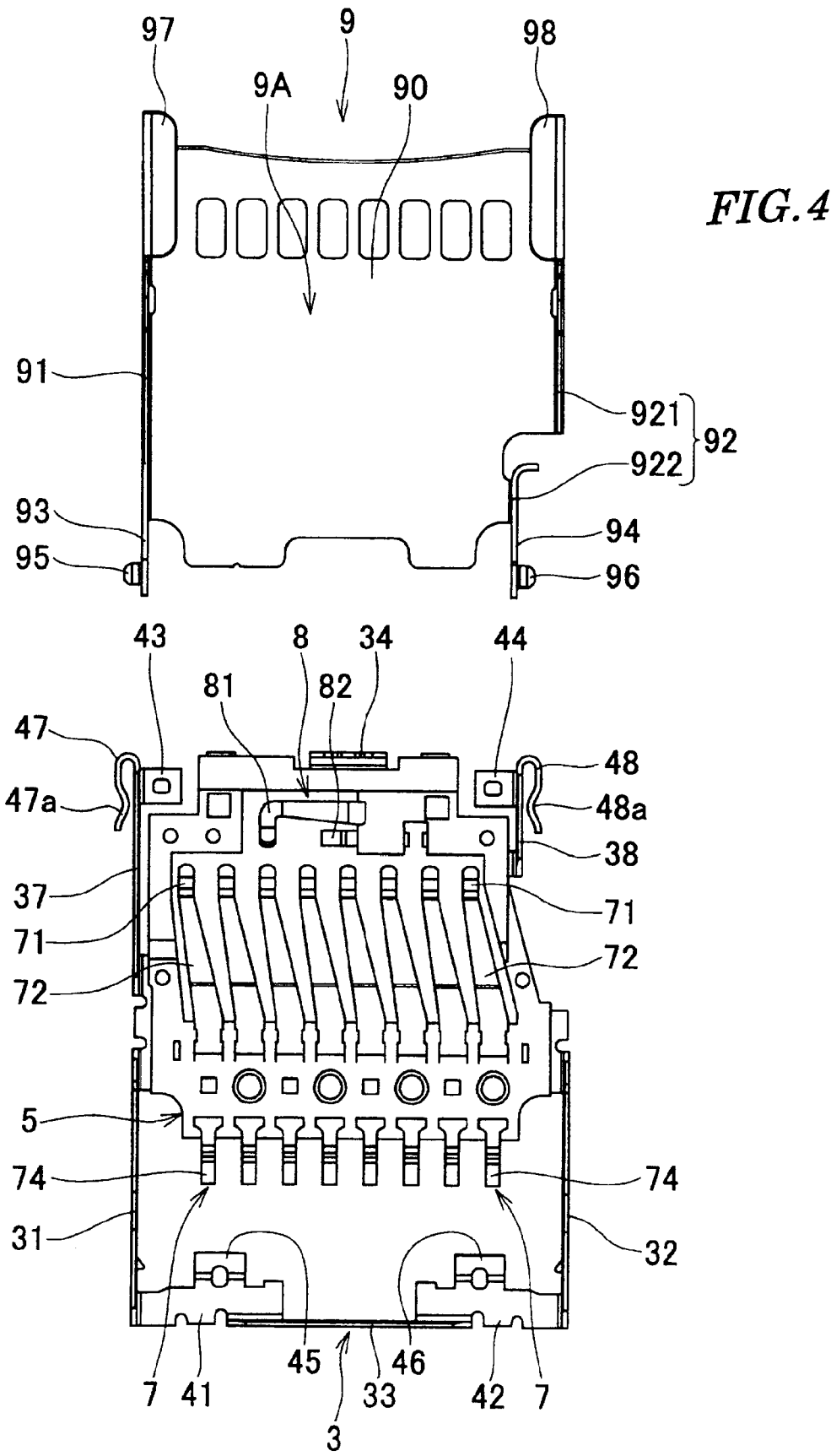
FIG. 4 is a plan view of the FIG. 1 connector in a state in which the base and a cover are separated.
Figure 5:
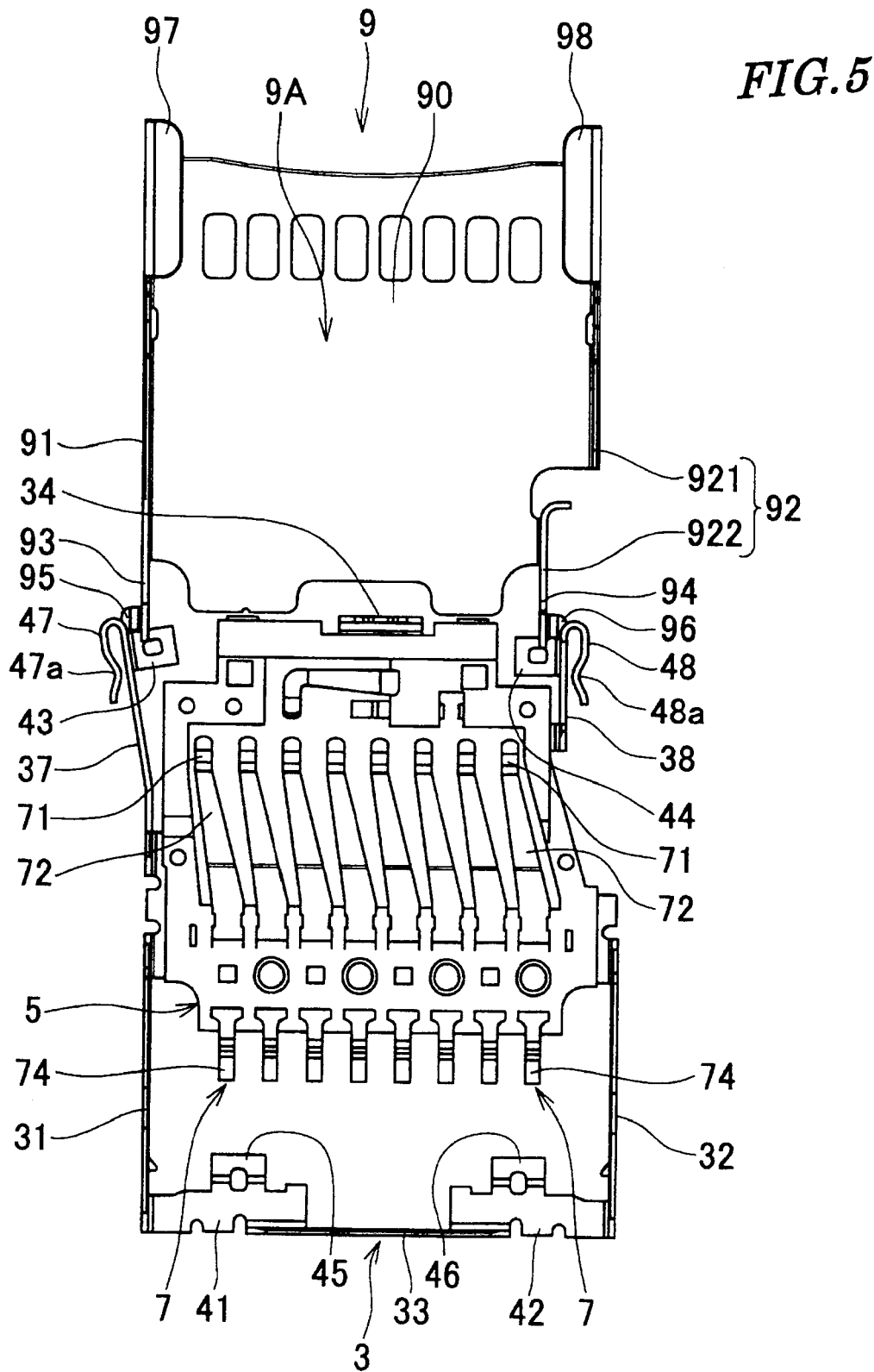
FIG. 5 is a plan view of the FIG. 1 connector in a state in which the base and the cover are halfway assembled.

As shown in FIGS. 1, 4, and 5, the cover 9 includes a cover main body 90, side walls 91 and 92, arms 93 and 94, pivot portions 95 and 96, and holding pieces 97 and 98. The cover 9 is formed by blanking and bending one metal plate.

Figure 9:
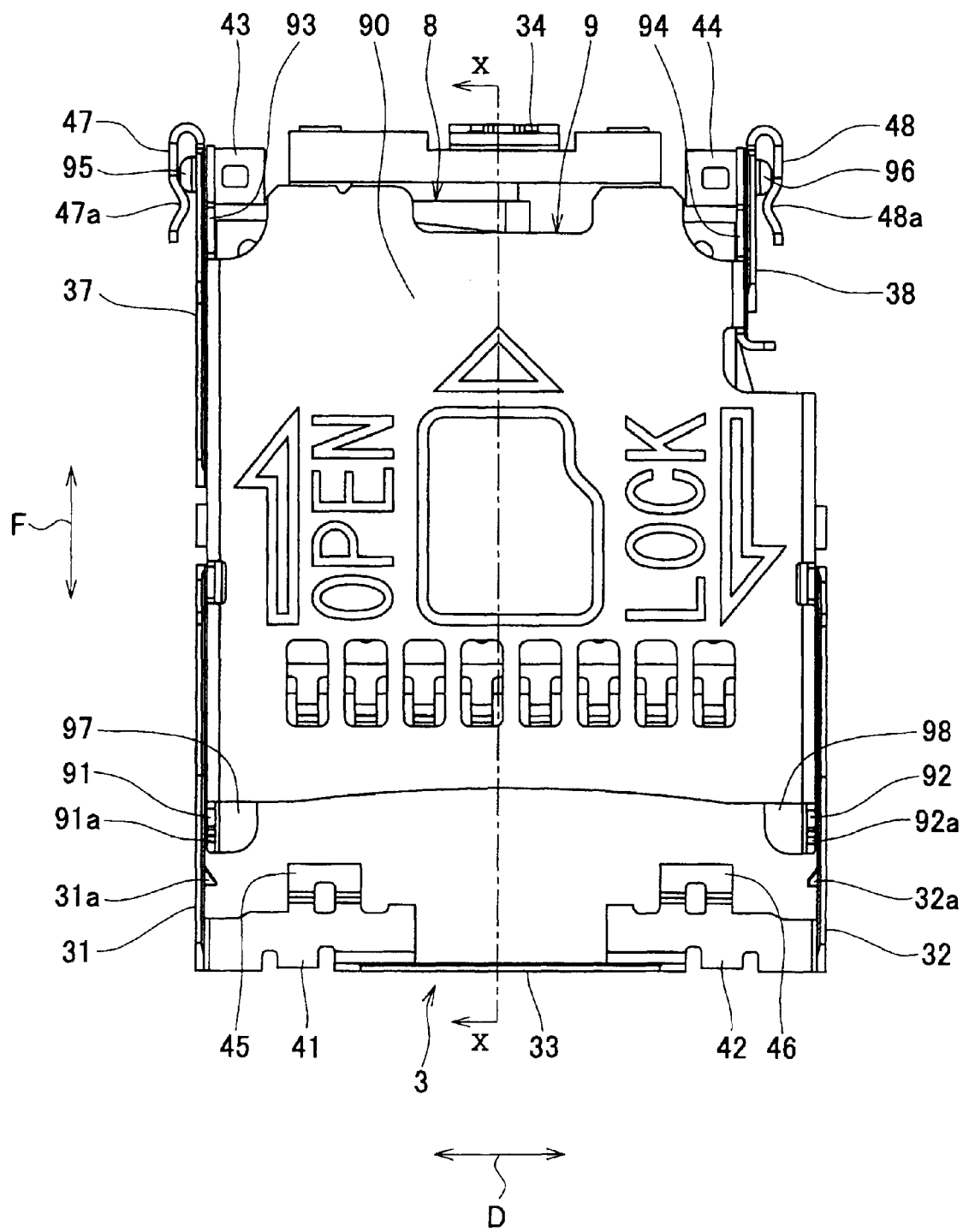
FIG. 9 is a plan view of the FIG. 1 connector in a state in which the cover is in an unlocked position, and the cover is pushed downward.

The cover main body 90 is substantially rectangular plate-shaped. The side wall 91 is plate-shaped, and is continuous to one side of the cover main body 90. The side wall 92 is continuous to the other side of the cover main body 90. The side wall 92 is formed by a front part 921 and a rear part 922. The front-rear relation of parts and portions of the cover 9 is determined with reference to the closed state (see FIG. 9) of the cover 9. The lower side as viewed in FIG. 9 is the front side of the cover 9, and the upper side as viewed in FIG. 9 is the rear side of the cover 9. The front part 921 is plate-shaped, and is located at the front portion of the cover main body 90. The rear part 922 is plate-shaped, and is at a location rearward of the front part 921 and inward of the same in the contact arranging direction D. The rear part 922 is shorter than the front part 921. Cutouts 91a and 92a are formed in respective upper portions of front ends of the side walls 91 and 92 (see FIGS. 9 and 11). A lock mechanism is formed by the locking lugs 31a and 32a of the respective side walls 31 and 32 of the base 3, and the cutouts 91a and 92a of the respective side walls 91 and 92 of the cover 9.

The arm 93 is plate-shaped, and is continuous to the rear end of the side wall 91. The arm 94 is continuous to the rear end of the rear part 922 of the side wall 92. The arms 93 and 94 are the same in length. It is not required to elastically deform the arms 93 and 94 to assemble the cover 9 to the base 3 as the conventional connector, not shown, so that it is possible to make the arms 93 and 94 shorter than those of the conventional connector. The arms 93 and 94 are shorter than the arm 37 of the base 3, and have substantially the same length as the arm 38. Since the arms 93 and 94 are short, the arms 93 and 94 are hardly elastically deformed.

The pivot portions 95 and 96 are disposed on respective outer surfaces of the rear ends of the arms 93 and 94.

The holding pieces 97 and 98 are continuous to the respective front portions of the side walls 91 and 92. The holding pieces 97 and 98 restrict the motion of the memory card 21 inserted in an accommodated space 9A defined by the cover main body 90 and the side walls 91 and 92, in a direction of the thickness of the cover main body 90.

To assemble the cover 9 shown in FIG. 4 to the base 3, as shown in FIG. 5, it is only required to once make the spacing between long holes (bearing) 37a and 38a (see FIGS. 6 and 7) wider than the spacing between the pivot portions 95 and 96 of the cover 9 by elastically deforming the arm 37, and insert the pivot portions 95 and 96 into the respective long holes 37a and 38a of the arms 37 and 38.

The cover 9 assembled to the base 3 as described above can be pivoted about the pivot portions 95 and 96 between the open position (see FIG. 6) in which the cover 9 is opened and the closed position (see FIG. 8) in which the cover 9 is closed. Further, the cover 9 can be slid between the unlocked position (see FIG. 9) in which the cover 9 in the closed position is unlocked and the lockable position (see FIG. 14) in which the cover 9 can be locked along the longitudinal direction (parallel to the front-rear direction F) of the arms 37 and 38 of the base 3.

After assembling the connector 1, the holddowns 43, 44, 45, and 46, and the terminal portions 74 of the contacts 7 are soldered to the respective pads on the printed circuit board. As a result, this prevents the arms 37 and 38 from being elastically deformed. What is more, the arms 93 and 94 of the cover 9 are made short, which improves the rigidity of the arms 93 and 94, so that even if the connector 1 is subject to a shock or the like, the cover 9 is prevented from being lifted or coming off the base 3.

Next, a description will be given of how the connector 1 is used with reference to FIGS. 6 to 9.

Figure 6:
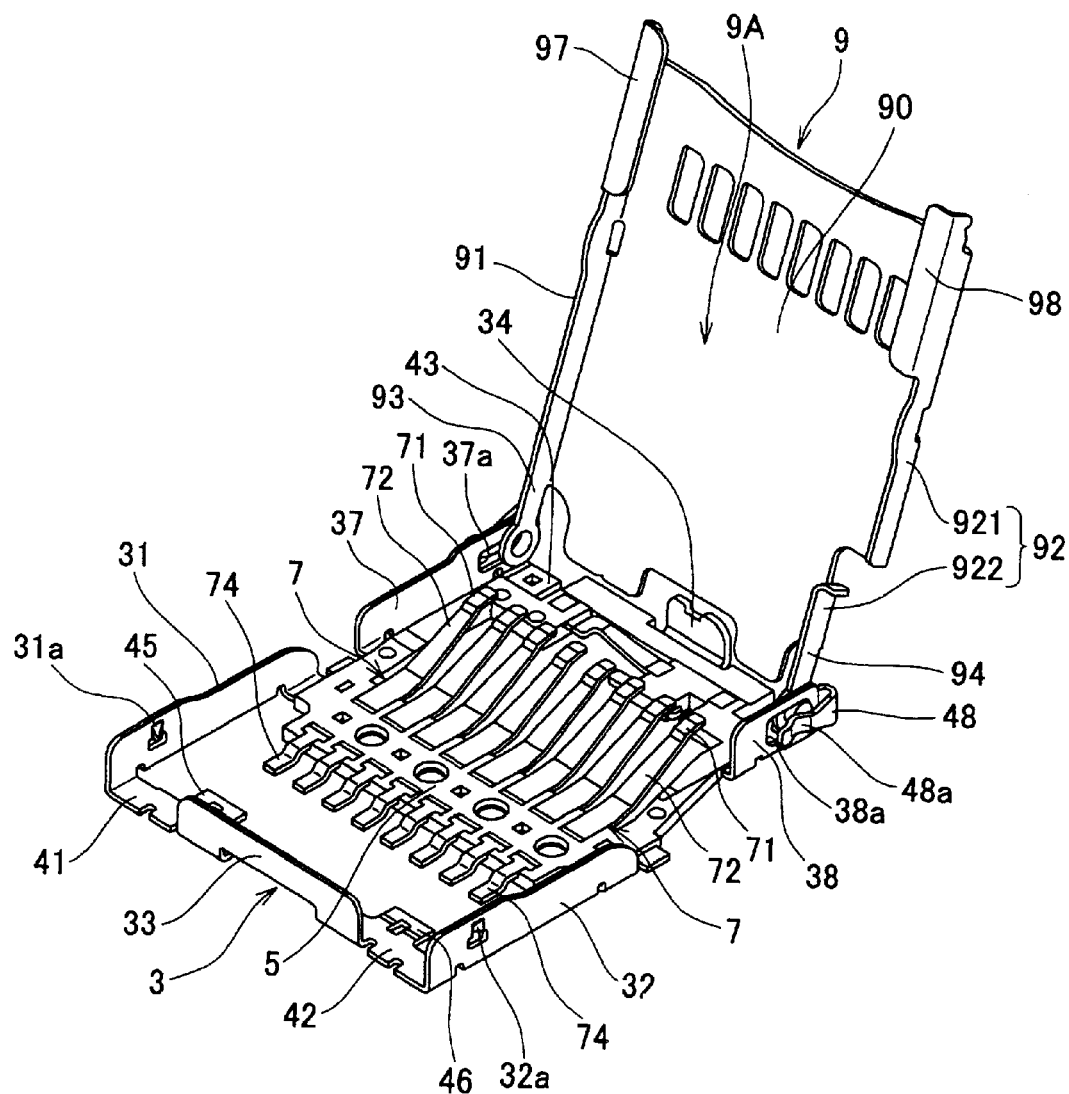
FIG. 6 is a perspective view of the FIG. 1 connector in a state in which the cover is in an open position.

As shown in FIG. 6, first, the cover 9 is slid from the lockable position to the unlocked position, and then, the cover 9 is pivoted from the closed position to the open position, whereby the cover 9 is opened.

Figure 7:
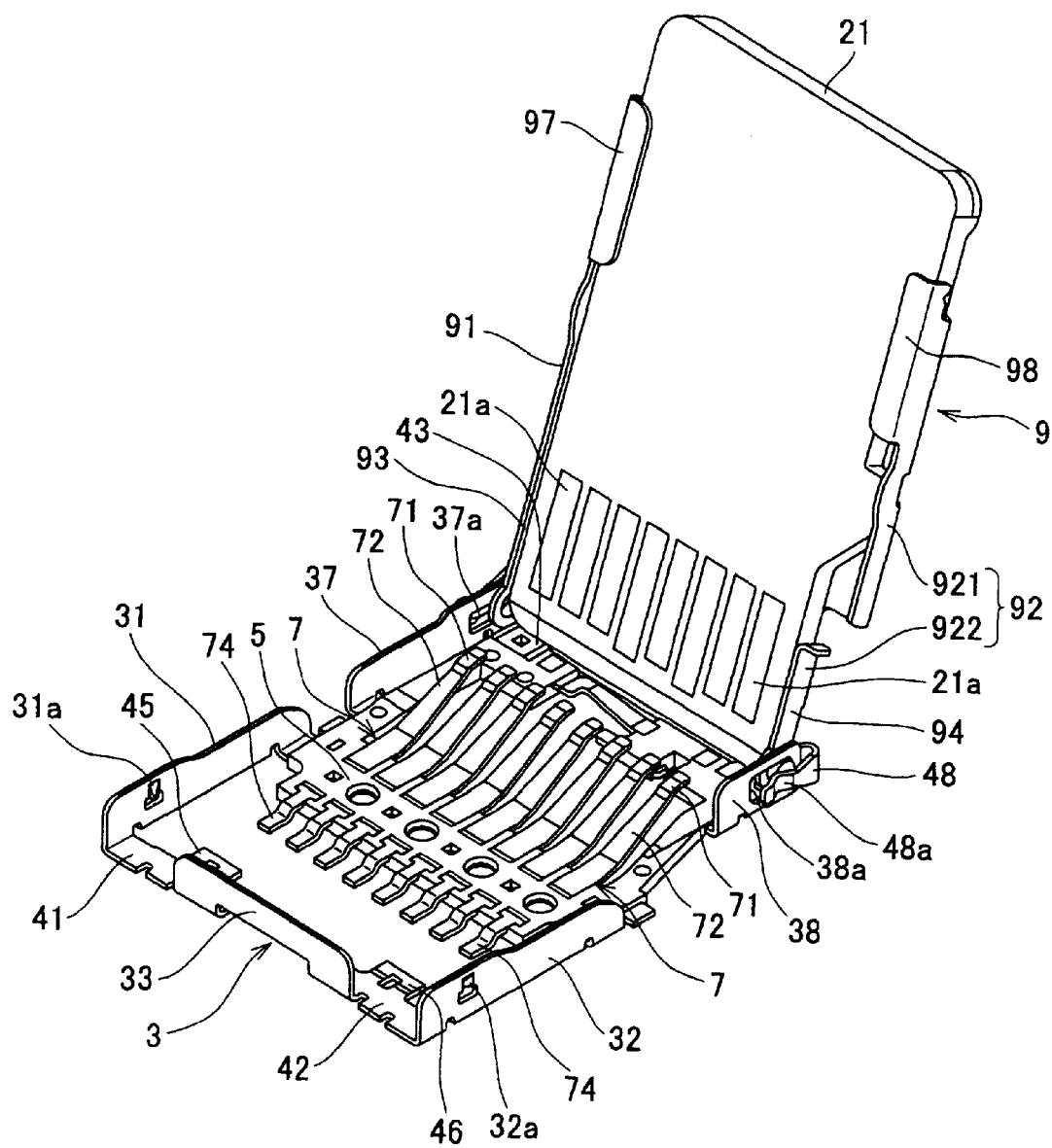
FIG. 7 is a perspective view of the FIG. 6 connector in a state in which a memory card is inserted in the cover.

Next, as shown in FIG. 7, the memory card 21 is inserted into the accommodating space 9A of the cover 9.

Figure 8:
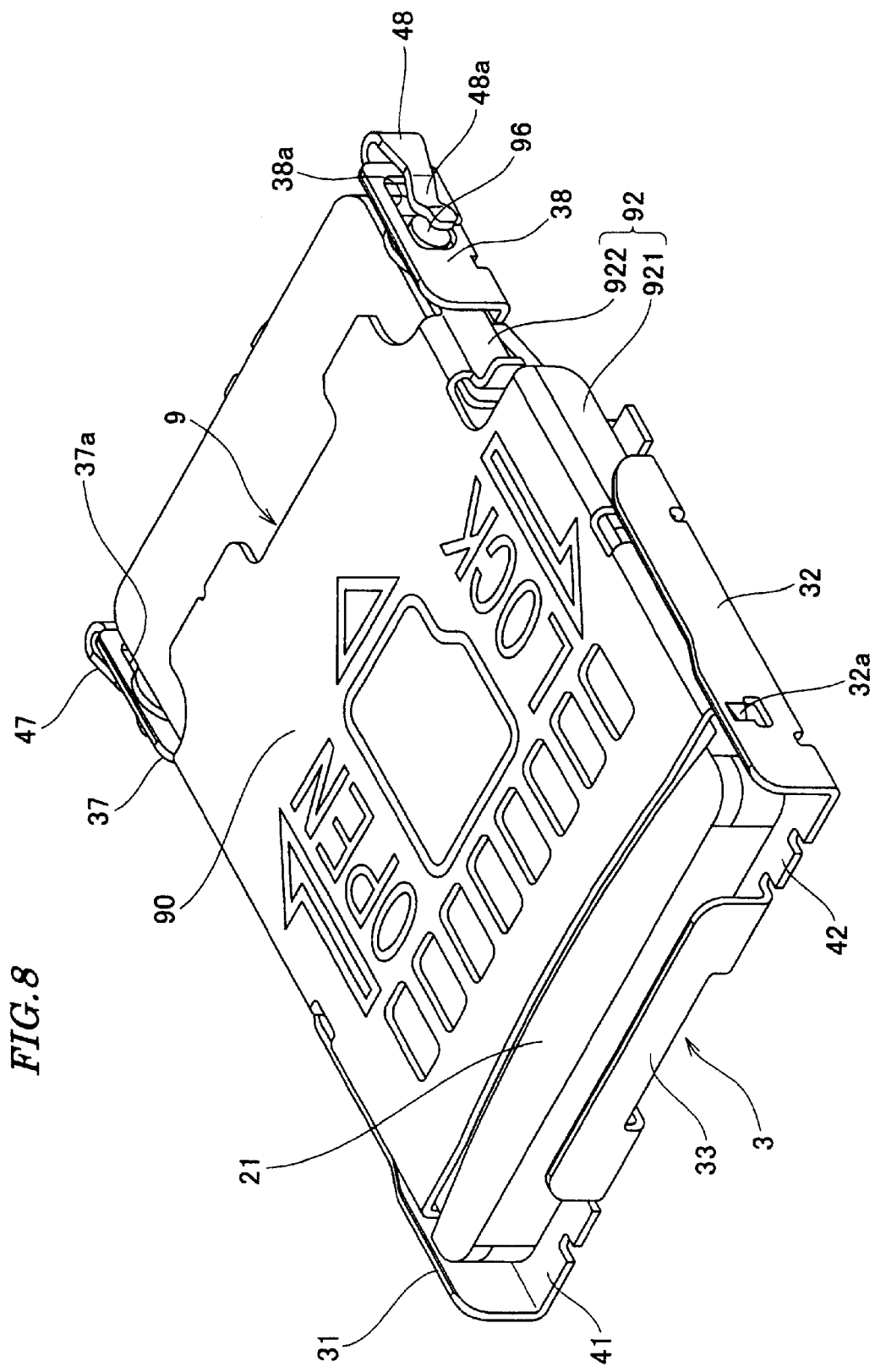
FIG. 8 is a perspective view of the FIG. 7 connector in a state in which the cover is in a closed position, and at the same time in a lockable position.

Finally, the cover 9 is pivoted from the open position to the closed position, whereby the cover 9 is closed, and as shown in FIG. 8, the cover 9 is slid from the unlocked position to the locked position.

As a result, the contact portions 71 of the contacts 7 are brought into contact with the terminal portions 21a of the memory card 21, respectively, whereby the memory card 21 and the printed circuit board are electrically connected to each other. At the same time, the first and second contact portions 81 and 82 of the switch contact 8 are brought into contact with the terminal portions 21a of the memory card 21, whereby it is detected by a detection circuit, not shown, that the memory card 21 and the printed circuit board are electrically connected to each other.

Figure 10:
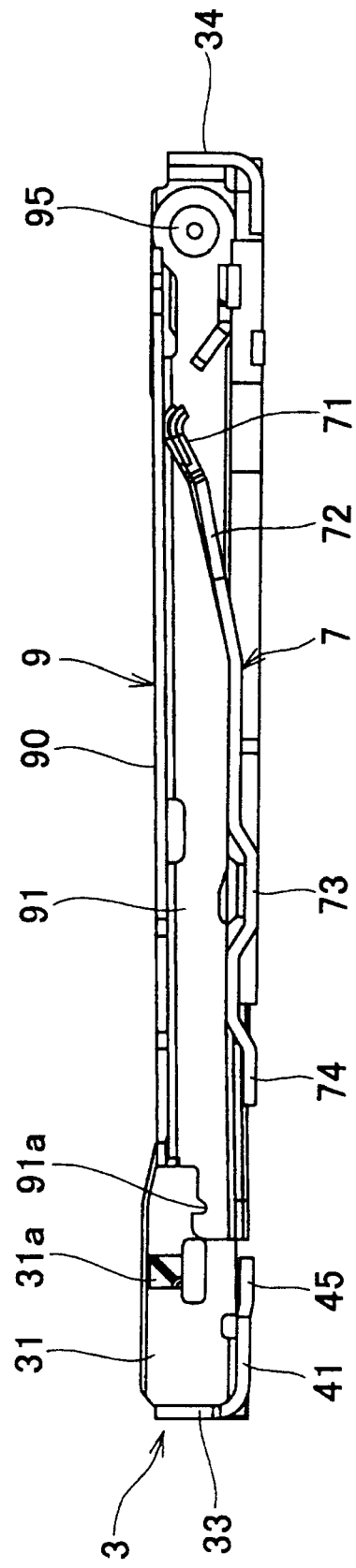
FIG. 10 is a conceptual view showing a cross-section taken along line X-X in FIG. 9.
Figure 12:
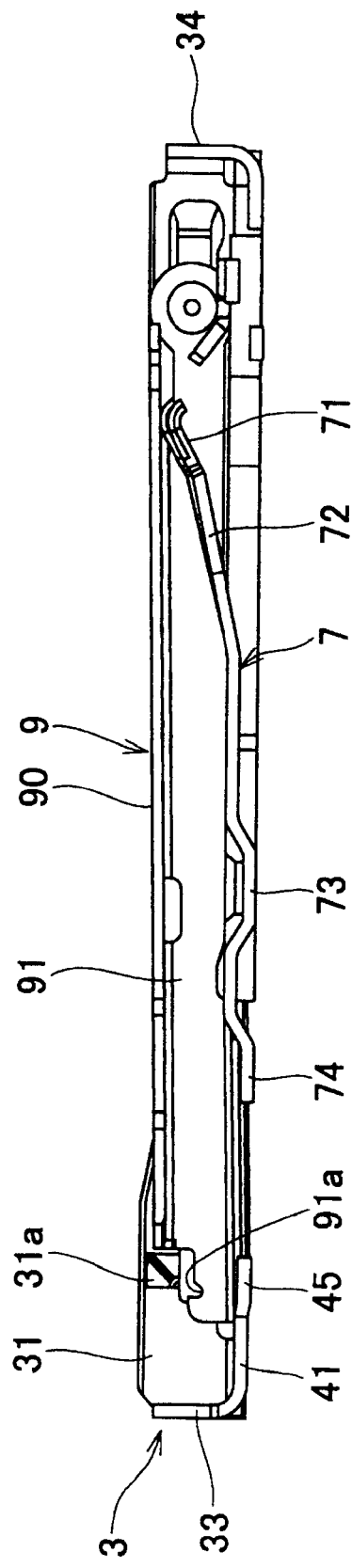
FIG. 12 is a conceptual view showing a cross-section when the cover is moved to the lockable position while being pushed downward.

Now, a description will be given of an operation for locking the cover 9 to the base 3 with reference to FIGS. 9 to 15. It should be noted that although FIGS. 10, 12, and 15 show cross-sections, hatching is omitted. Further, each of FIGS. 9 to 15 illustrates a state in which the memory card 21 is not inserted in the accommodating space 9A of the cover 9, but the following description is given assuming that the memory card 21 is inserted therein.

After inserting the memory card 21 into the accommodating space 9A as shown in FIG. 7, the cover 9 is pivoted from the open position to the closed position, and the cover 9 is pushed downward by a fingertip of an operator toward the base 3 against the spring force of the spring portions 72 of the contacts 7, as shown in FIGS. 9, 10, and 11. As a result, this causes the front portion of the cover 9 to be located below the rear portion of the cover 9.

Figure 13:
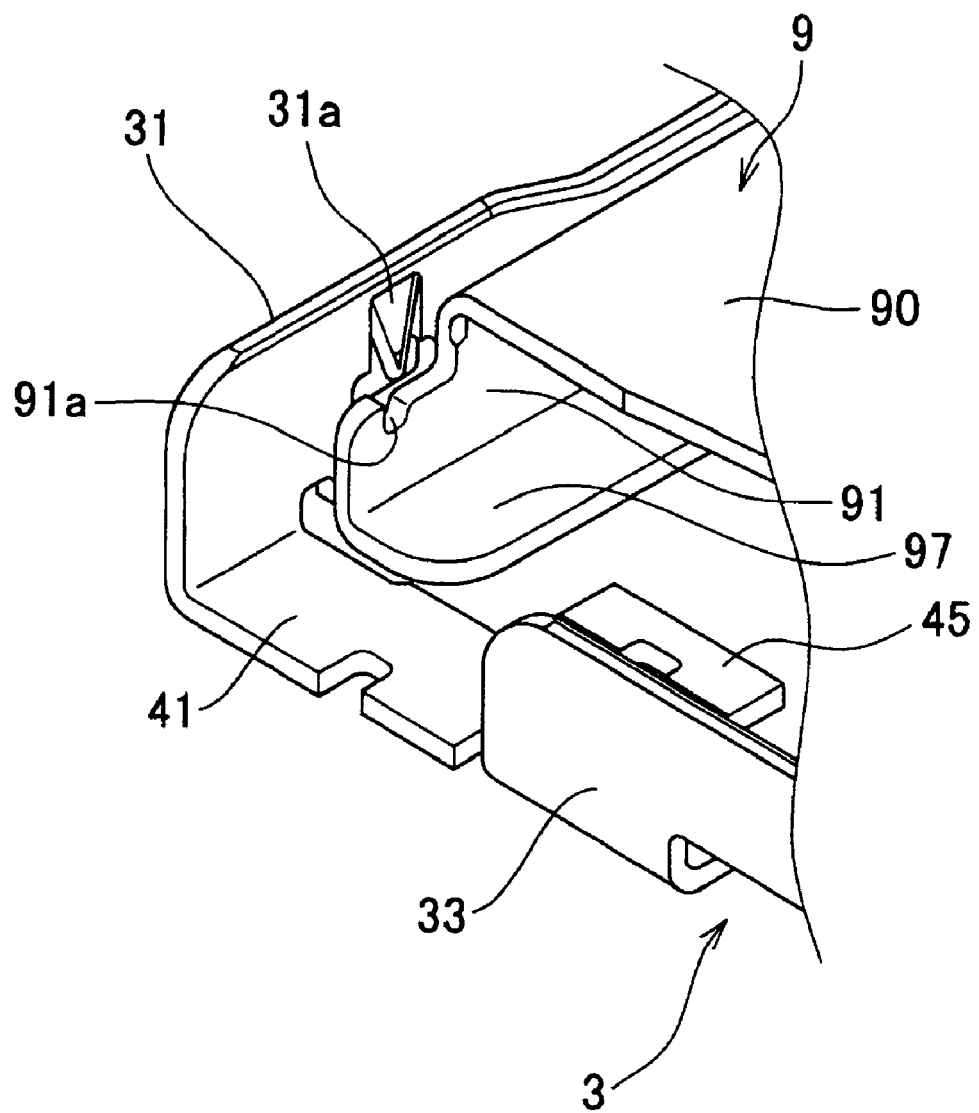
FIG. 13 is an enlarged perspective view of the lock mechanism of the connector in the state shown in FIG. 12.

In this state, as shown in FIGS. 12 and 13, the cover 9 is slid by the fingertip from the unlocked position to the lockable position (front of the base 3). At this time, the pivot portions 95 and 96 are moved past the protruding portions 47a and 48a by pushing them outward against the spring force of the click boards 47 and 48, so that the operator of the cover 9 senses a click. Thus, a click mechanism is formed by the click boards 47 and 48, and the pivot portions 95 and 96. In the state shown in FIGS. 12 and 13, the cutouts 91a and 92a of the cover 9, and the locking lugs 31a and 32a of the base 3 have not been engaged, and hence the cover 9 has not been locked to the base 3.

Figure 14:
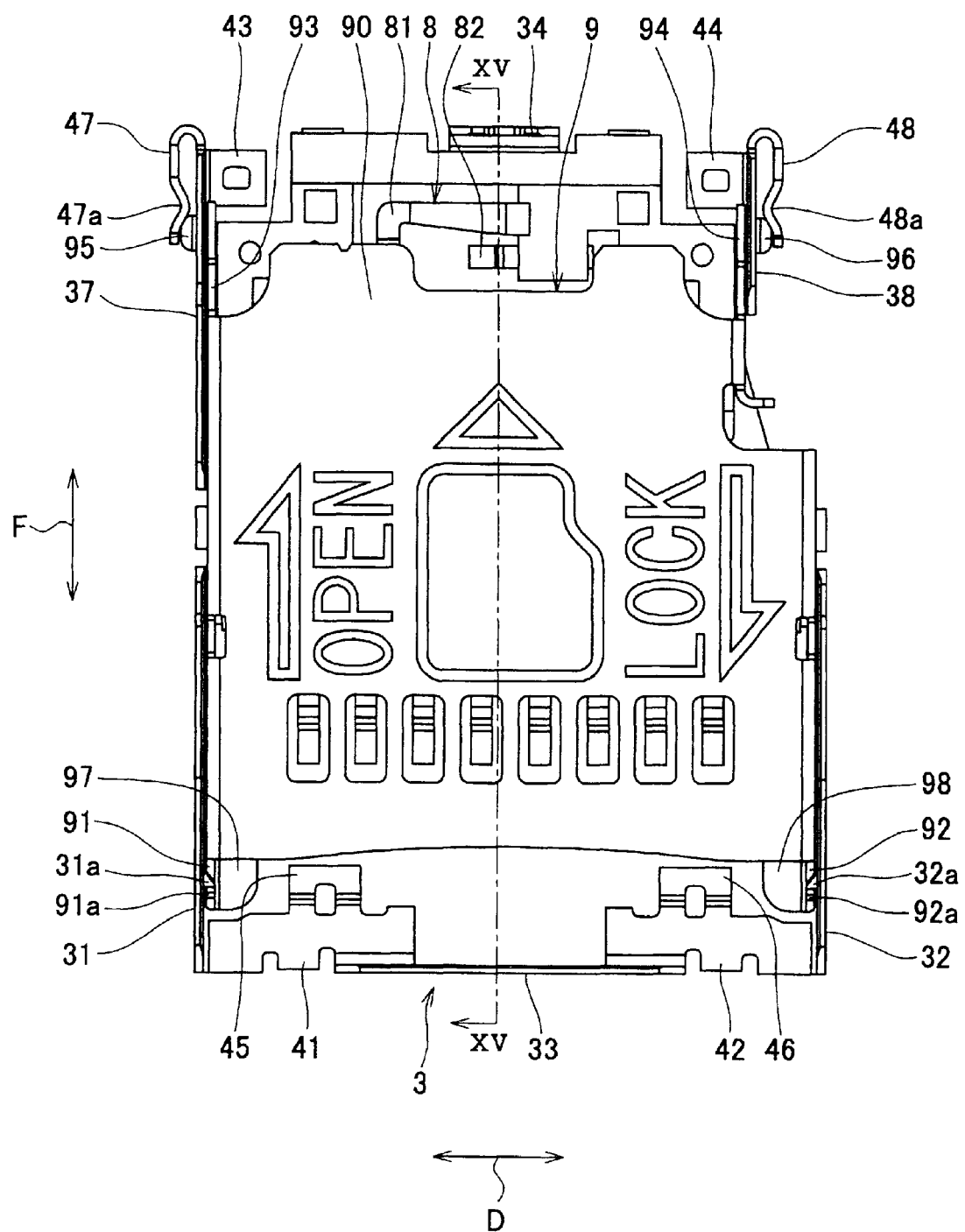
FIG. 14 is a plan view of the FIG. 1 connector in a state in which the cover is in the closed position and at the same time in the lockable position.
Figure 15:
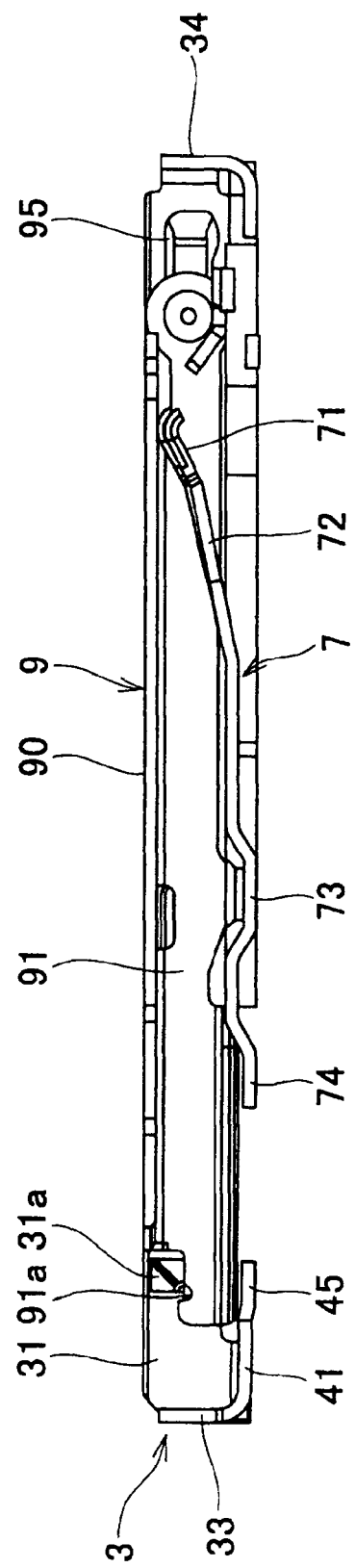
FIG. 15 is a conceptual view showing a cross-section taken along line XV-XV in FIG. 14.
Figure 16:
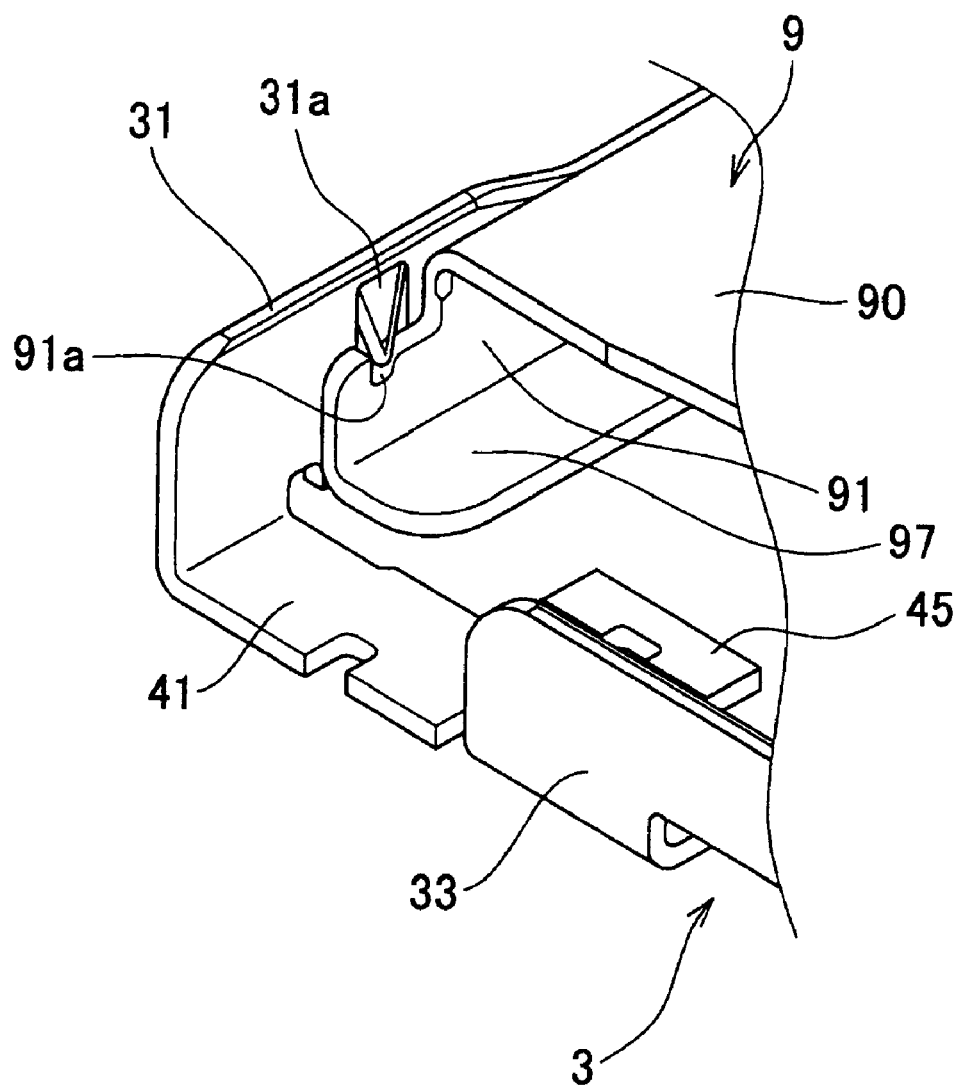
FIG. 16 is an enlarged perspective view of the lock mechanism of the connector in the state shown in FIG. 15.

If the fingertip pressing the cover 9 is removed from the cover 9, the contact portions 71 lift up the cover 9 by the spring force of the spring portions 72 of the contacts 7, and as shown in FIGS. 14, 15, and 16, the cutouts 91a and 92a of the cover 9, and the locking lugs 31a and 32a of the base 3 are engaged, which locks the cover 9 to the base 3. In this state, even if the operator tries to open the cover 9, the cover 9 cannot be opened.

To unlock the cover 9, it is only required to perform an operation inverse to the above-described operation for locking the cover 9 to the base 3.

Further, the rigidity of the arms 93 and 94 is improved by reducing the length of the arms 93 and 94 short, and further, after mounting the base 3 on the printed circuit board, the arms 37 and 38 are fixed to the printed circuit board by soldering the holddowns 43 and 44 thereto, which prevents the arms 37 and 38 from being elastically deformed. Therefore, even when the memory card 21 is about to pop out of the connector 1 due to a shock from the outside, the cover 9 is neither lifted from the base 3 nor detached from the base 3. Therefore, contact stability between the connector 1 and the memory card 21 is maintained, which prevents breakage or loss of data being transmitted from the memory card 21 to the printed circuit board or from the printed circuit board to the memory card 21.

It should be noted that although in this embodiment, the arm 37 of the base 3 is made long and elastically deformable, and the arm 38 is made short and less liable to be elastically deformed, both of the arms 37 and 38 may be made long and may be elastically deformable.

Further, when the arm 38 is made short and is made less liable to be elastically deformed, the holddown 44 may not be provided on the arm 38.

It should be noted that although the cover 9 is made slidable between the unlocked position and the lockable position along the front-rear direction F, it is not necessarily required to slide the cover 9, but it is only required to pivot the cover 9 about the pivot portions 95 and 96.

Further, the lock mechanism and the click mechanism are not limited to those shown in the drawings. Further, it is possible to omit the click mechanism.

It should be noted that although the holddown 43 is employed as the fixing portion of the elastically deformable arm 37, the fixing portion of the arm 37 is not limited to the holddown. For example, a pin which is inserted in a hole formed in the printed circuit board may be provided on the arm 37 as a fixing portion, or a hole in which a pin formed on the printed circuit board is inserted may be formed in the arm 37 as the fixing portion.

Further, the arms may be provided only on the base 3. In this case, the side walls of the cover 9 are extended rearward, and the pivot portions are disposed on the extended side walls.

It should be noted that the arm 37 and the holddown 43 as the fixing portions may be formed of a metal plate, and the remaining portions of the base 3 may be formed of another material. Further, the entire base 3 including the arm 37 and the holddown 43 as the fixing portion may be formed of a material (e.g. resin) other than a metal plate.

It is further understood by those skilled in the art that the foregoing are the preferred embodiments of the present invention, and that various changes and modification may be made thereto without departing from the spirit and scope thereof.

What is claimed is:

1. A connector comprising:
   a base including a pair of arms, said base being mounted on a circuit board, and for having a card-type electronic device placed thereon;
   a plurality of contacts held by said base in an insulated state;
   a cover that urges the card-type electronic device against said contacts;
   a pair of pivot portions that are provided on one of said pair of arms or said cover; and
   bearings that are formed in the other of said pair of arms and said cover, for supporting said pair of pivot portions in a manner pivotally-movable to thereby connect said cover to said base in a manner pivotally-movable,
   wherein at least one of said pair of arms is elastically deformable in an axial direction of said pivot portions, and
   wherein at least said elastically deformable arm is provided with a fixing portion that is fixed to the circuit board.

2. The connector as claimed in claim 1, wherein each of said bearings is a long hole that holds an associated one of said pivot portions in a manner movable in a longitudinal direction of the arms.

3. The connector as claimed in claim 2, wherein said cover includes a lock mechanism that locks said cover to said base, when said cover is moved by a predetermined distance in the longitudinal direction of said arms in a state in which said cover covers said base.

4. The connector as claimed in claim 3, wherein said cover includes a click mechanism for causing an operator of said cover to sense a click when said cover is locked to said base, and when said cover is unlocked from said base.

5. The connector as claimed in claim 1, wherein at least said elastically deformable arm and said fixing portion are formed of a metal plate.

6. The connector as claimed in claim 2, wherein at least said elastically deformable arm and said fixing portion are formed of a metal plate.

7. The connector as claimed in claim 3, wherein at least said elastically deformable arm and said fixing portion are formed of a metal plate.

8. The connector as claimed in claim 4, wherein at least said elastically deformable arm and said fixing portion are formed of a metal plate.

* * * * *